United States Patent
Gray et al.

(10) Patent No.: US 10,203,032 B2
(45) Date of Patent: Feb. 12, 2019

(54) UPDATING SHIFTING PROFILES FOR ADAPTIVE TRANSMISSIONS

(71) Applicant: Ford Motor Company, Dearborn, MI (US)

(72) Inventors: Charles Ernest Gray, White Lake, MI (US); Donald G. Levens, Plymouth, MI (US); Gurjeet Singh, Livonia, MI (US); Douglas Ryan Cecil, Canton, MI (US); Matthew Thomas Trent, South Lyon, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 79 days.

(21) Appl. No.: 15/464,984

(22) Filed: Mar. 21, 2017

(65) Prior Publication Data
US 2018/0274668 A1    Sep. 27, 2018

(51) Int. Cl.
*F16H 61/02*    (2006.01)

(52) U.S. Cl.
CPC . *F16H 61/0213* (2013.01); *F16H 2061/0223* (2013.01)

(58) Field of Classification Search
CPC .................. F16H 61/0213; F16H 2061/0223
See application file for complete search history.

(56) References Cited

U.S. PATENT DOCUMENTS

| 2002/0065595 | A1* | 5/2002 | Shin | F16H 61/0213 701/50 |
| 2008/0162008 | A1* | 7/2008 | Kojima | F16H 61/0213 701/55 |
| 2014/0129104 | A1 | 5/2014 | Park | |

OTHER PUBLICATIONS

"Computer Transmission Shift Adaptive Relearning", Suburban Transmissions, Jan. 25, 2017, http://www.toptransmissions.com/transmission-computer-shift-relearn.html.
Martineck, "The Truth About Adaptive Transmissions", TTAC (the truth about cars), Dec. 27, 2007, http://www.thetruthaboutcars.com/2007/12/the-truth-about-adaptive-tran . . .
"Transmission Adaptive Functions", sandyblogs.com, Mar. 3, 2016, https://sandyblogs.com/techlink/?p=5754.
"Transmission Adaptive Functions and Correcting Low Mileage Harsh Shifts—2015 Cadillac Chevrolet GMC", GM.OEMDTC. com, Dec. 6, 2015; http://gm.oemdtc.com/492/transmission-adaptive-functions-and-correctin . . .

* cited by examiner

*Primary Examiner* — Edwin A Young
(74) *Attorney, Agent, or Firm* — Brandon Hicks; Bejin Bieneman PLC

(57) ABSTRACT

A computer having a processor and memory that stores instructions executable by the processor, wherein the computer is programmed to: receive adaptive transmission clutch data from a plurality of first vehicles, the data from each first vehicle including a modified shifting profile; determine, using the received data, an updated initial shifting profile; and provide the updated initial profile to a plurality of second vehicles.

20 Claims, 5 Drawing Sheets

UPDATING SHIFTING PROFILES FOR ADAPTIVE TRANSMISSIONS

BACKGROUND

Modern vehicles may be equipped with adaptive transmissions that study driving behavior and then make adjustments that provide a suitable throttle response during shifting. Adjustments may pertain to clutch component actuation, clutch timing, and the like.

SUMMARY

Figure 1:
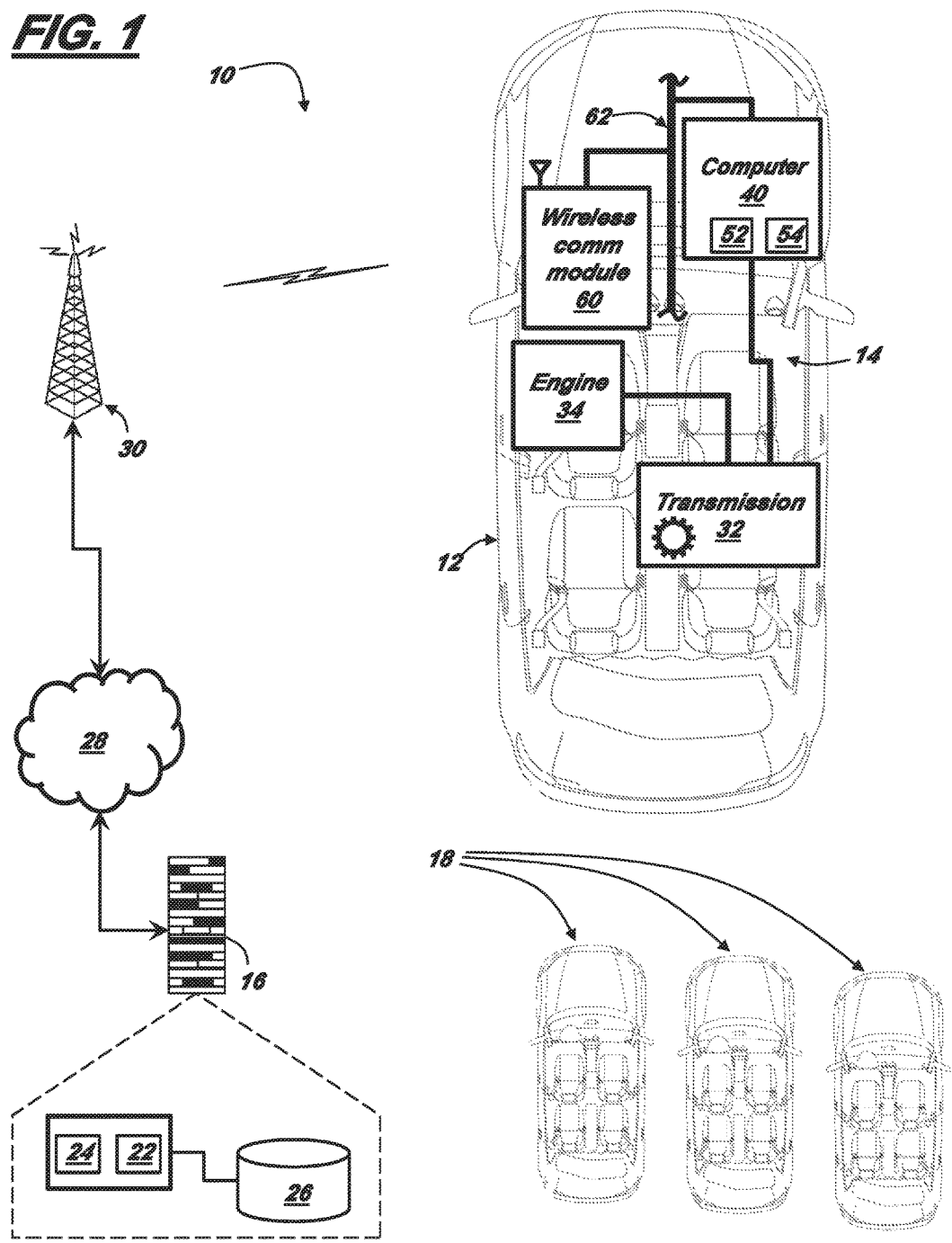
FIG. 1 is a schematic diagram of an adaptive transmission calibration system.

With reference to the figures, wherein like numerals indicate like parts throughout the several views, there is shown an adaptive transmission calibration system. According to one example, a computer is described that may be programmed to: receive data from a plurality of first vehicles having a vehicle module configured to use at least one initial profile; using the data, determine an updated initial profile; and provide the updated initial profile to a plurality of second vehicles.

According to another example, a computer is described that may be programmed to: receive clutch data from a plurality of first vehicles each having an adaptive transmission configured to use at least one initial shifting profile; using the data, determine an updated initial shifting profile; and provide the updated initial shifting profile to a plurality of second vehicles.

According to an example, the computer may be programmed such that for each of the plurality of first vehicles, the data is associated with clutch pressure data and torque output data during a shift event, wherein the data also is associated with a learn mode algorithm executed by an onboard computer that controls the respective adaptive transmission.

According to an example, the computer may be programmed such that for each of the plurality of first vehicles, the clutch data is associated with an on-coming shift event or an off-going shift event at a clutch assembly of the respective transmission.

According to an example, the computer may be programmed such that for each of the plurality of first vehicles, the clutch data is associated with an on-coming shift event or an off-going shift event at a clutch assembly of the respective transmission.

According to an example, the computer may be programmed such that the clutch data comprises clutch pressure data and corresponding torque output data for a clutch assembly of the adaptive transmission during an oncoming shift or an off-going shift.

According to an example, the computer may be programmed such that the clutch data further comprises one or more of vehicle identifier data, environmental data, or vehicle-operation data, wherein the determination of the updated initial shifting profile is at least partially based on the environmental data, the vehicle-operation data, or both.

According to an example, the computer may be programmed such that environmental data is associated with temperature data, altitude data, precipitation data, road-condition data, or a combination thereof, and wherein the vehicle-operation data is associated with a vehicle driving mode, a user-driving style, or a combination thereof.

According to an example, the computer may be programmed such that the clutch data is transmitted from the plurality of first vehicles based on a trigger event, wherein the trigger event includes at least one of an odometer parameter or a time parameter.

According to an example, the computer may be programmed such that the clutch data comprises at least one modified shifting profile, wherein, for each of the plurality of first vehicles, the modified shifting profile is a modification of the at least one initial shifting profile that has been modified by a learn mode algorithm executed by an onboard vehicle computer that controls the respective adaptive transmission.

According to an example, the computer may be programmed such that the determination of the updated initial shifting profile includes determining an averaging calculation of the modified shifting profiles received from at least some of the plurality of first vehicles.

According to an example, the computer may be programmed such that determining the averaging calculation includes calculating an average clutch pressure value for a plurality of corresponding predetermined data points within the modified shifting profiles.

According to an example, the computer further may be programmed to ignore at least some of the clutch data received from the plurality of first vehicles based on the at least some of the clutch data being greater than a first threshold, less than a second threshold, or a combination thereof.

According to an example, the computer may be programmed such that the determination of the updated initial shifting profile includes determining a trend-line calculation of the modified shifting profiles received from at least some of the plurality of first vehicles.

According to an example, the computer further may be programmed to ignore at least some of the clutch data received from the plurality of first vehicles based on the at least some of the clutch data being greater than a first threshold, less than a second threshold, or a combination thereof.

According to an example, the computer may be programmed such that providing the updated initial shifting profile includes at least one of: flashing the memory of a computer onboard each of the plurality of second vehicles during a vehicle manufacturing process, re-flashing the memory of a computer onboard at least some of the plurality of second vehicles at a vehicle service center, or transmitting an over-the-air update to at least some of the plurality of first or second vehicles containing the updated initial shifting profile.

According to another example, a method is disclosed that includes: receiving clutch data from a plurality of first vehicles each having an adaptive transmission configured to use at least one initial shifting profile; using the data, determining an updated initial shifting profile; and providing the updated initial shifting profile to a plurality of second vehicles.

According to an example, the method may include: wherein, for each of the plurality of first vehicles, the clutch data is associated with an on-coming shift event or an off-going shift event at a clutch assembly of the respective transmission.

According to an example, the method may include: wherein the clutch data comprises at least one modified shifting profile, wherein, for each of the plurality of first vehicles, the modified shifting profile is a modification of the at least one initial shifting profile that has been modified by a learn mode algorithm executed by an onboard vehicle computer that controls the respective adaptive transmission.

According to an example, the method may include: wherein the determination of the updated initial shifting profile includes determining an averaging calculation or a trend-line calculation of the modified shifting profiles received from at least some of the plurality of first vehicles.

According to an example, the method may include: wherein determining the averaging calculation includes calculating an average clutch pressure value for a plurality of corresponding predetermined data points within the modified shifting profiles.

Any of the computer programming instructions described above and herein may be carried out as a method or process. Similarly, any methods or processes described above and herein may be carried out as instructions executable by a computing device such as a vehicle computer. Further, any of the examples described above may be used in any suitable combination with one another.

DETAILED DESCRIPTION

Thus, with reference to the figures, wherein like numerals indicate like parts throughout the several views, there is shown an adaptive transmission calibration system there is shown an adaptive transmission calibration system that uses data from a fleet of vehicles to improve automatic transmission shifting in at least newly-manufactured vehicles. In vehicles having adaptive transmissions, a number of initial shifting profiles can be stored in memory of an onboard computer; each of these initial shifting profiles being associated with shifts between different gear ratios, and these profiles can be changed or modified repeatedly as the vehicle is operated. Typically, in the first one to two months of driving (e.g., often within the first 1000-2000 miles), an adaptive transmission may make some of its largest adjustments—e.g., as the adaptive transmission settles at a number of modified shifting profiles. As used herein, settling pertains to these initial adaptive adjustments of the shifting profiles associated with the clutch assemblies within an adaptive transmission. Thus also, as used herein, a settling period pertains to the engine operating hours or odometers miles driven during settling). To illustrate, a respective onboard computer can execute a learning mode and gradually modify an initial shifting profile (to a modified shifting profile) based on a number of criteria such as the characteristics of transmission and engine components, the manufacturing tolerances thereof, driving style of a new vehicle user, the environment (e.g., temperature, altitude, road conditions, etc.) in which the respective vehicle is operated, etc. In general, these modified shifting profiles may be repeatedly modified thereafter as the vehicle is driven differently, parts begin to wear, etc. In this manner, adaptive transmissions can improve powertrain performance throughout the useful life of the vehicle.

As described more below and as shown in FIG. 1, an adaptive transmission calibration system 10 may comprise a number of first vehicles 12 each having an adaptive transmission system 14 and a backend computer (or remote server) 16 that can be programmed to receive clutch data from first vehicles 12, the clutch data being associated with the respective modified shifting profiles of each first vehicle 12 (e.g., after a settling period). Only one first vehicle 12 is shown for purposes of illustration; however, clutch data may be received from any suitable quantity of first vehicles 12. According to at least one example, each first vehicle 12 is similar or identical (or at least comprises a similar or identical adaptive transmission system 14); therefore, only one first vehicle 12 will be described below.

As described more below, computer 16 may classify the clutch data received from the first vehicles 12 in any suitable manner—e.g., according to vehicle make and model, according to transmission model, according to environmental conditions, according to user driving styles, and/or the like, and thereafter, computer 16 may determine a number of updated initial shifting profiles that may be provided to second vehicles 18 which may have, in at least one example, an identical or similar powertrain and/or transmission model. In at least one example, second vehicles 18 are newly-manufactured vehicles or vehicles still at a manufacturing facility of the same make and model, and the updated initial shifting profile is provided by flashing or re-flashing software stored on a respective onboard computer (e.g., on an assembly line). In this manner, when the second vehicles 18 are leased or sold, the respective adaptive transmission systems (of the second vehicles 18) may require less adaptation and/or the respective settling periods may be shorter—thereby providing maximum powertrain performance more expediently—thereby improving the user experience and improving user satisfaction.

Backend computer 16 may be a single computer or multiple computing devices communicatively networked together. In general, computer 16 may comprise one or more processors 22 (only one is shown for illustration purposes), any suitable quantity of memory 24, and one or more databases 26 (again, only one is shown for illustration purposes). Processor(s) 22 can be any type of device capable of processing electronic instructions such as microprocessors, microcontrollers or controllers, an application specific integrated circuits (ASICs), and any combination thereof—just to name a few non-limiting examples. In general, processor(s) 22 may be programmed to execute digitally-stored instructions, which may be stored in memory 24, which enable the computer 16, among other things, to receive clutch data from multiple first vehicles 12, store the clutch data in memory 24 and/or database(s) 26, parse and filter the stored clutch data, perform one or more mathematical calculations using the clutch data to determine one or more updated initial shifting profiles (e.g., for a particular adaption transmission system model), and provide the one or more updated initial shifting profiles to at least some second vehicles 18, as described more below.

Memory 24 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 24 may store one or more computer program products which may be embodied as software, firmware, or the like.

Database(s) 26 may store, among other things, collections of modified shifting profile data from first vehicles 12 in a filing system. For example, one or more databases 26 may be dedicated to storing adaptive transmission-related data associated with one vehicle make, model, and transmission system, while another one or more databases 26 may be dedicated to storing similar information associated with another vehicle make, model, and transmission system. Processor(s) 22 may check-in (e.g., upload) to database(s) 26 and/or check-out (e.g., download) from database(s) modified shifting profile data and/or any suitable data.

Backend computer 16 is shown communicatively coupled to first vehicle(s) 12 via a land communication network 28 and a wireless communication network 30. The land communication network 28 can enable connectivity to public switched telephone network (PSTN) such as that used to provide hardwired telephony, packet-switched data communications, internet infrastructure, and the like. Wireless communication network 30 may include satellite communication architecture and/or may include cellular telephone communication over wide geographic region(s). Thus, in at least one example, network 30 includes any suitable cellular infrastructure that could include eNodeBs, serving gateways, base station transceivers, and the like. Further, network 30 may utilize any suitable existing or future cellular technology (e.g., including LTE, CDMA, GSM, etc.). The networks 28, 30 are merely illustrative; for instance, in other examples, backend computer 16 may have cellular capability allowing first vehicles 12 to communicate directly with computer 16 using only wireless communication network 30 or the like.

As shown in FIG. 1, first vehicle 12 is shown as a passenger car; however, this is merely an example. First vehicle 12 also could be any suitable car, truck, sports utility vehicle (SUV), recreational vehicle, a bus, or the like that includes the adaptive transmission system 14 that has been operated more than a threshold—e.g., more than a threshold quantity of engine operating hours, more than a threshold quantity of odometer miles, for at least a settling period that permits the adaptive transmission system 14 to modify the initial shifting profile, etc. Additionally, first vehicle 12 may be capable of operating in one or more autonomous driving modes; however, this is not required.

Figure 2:
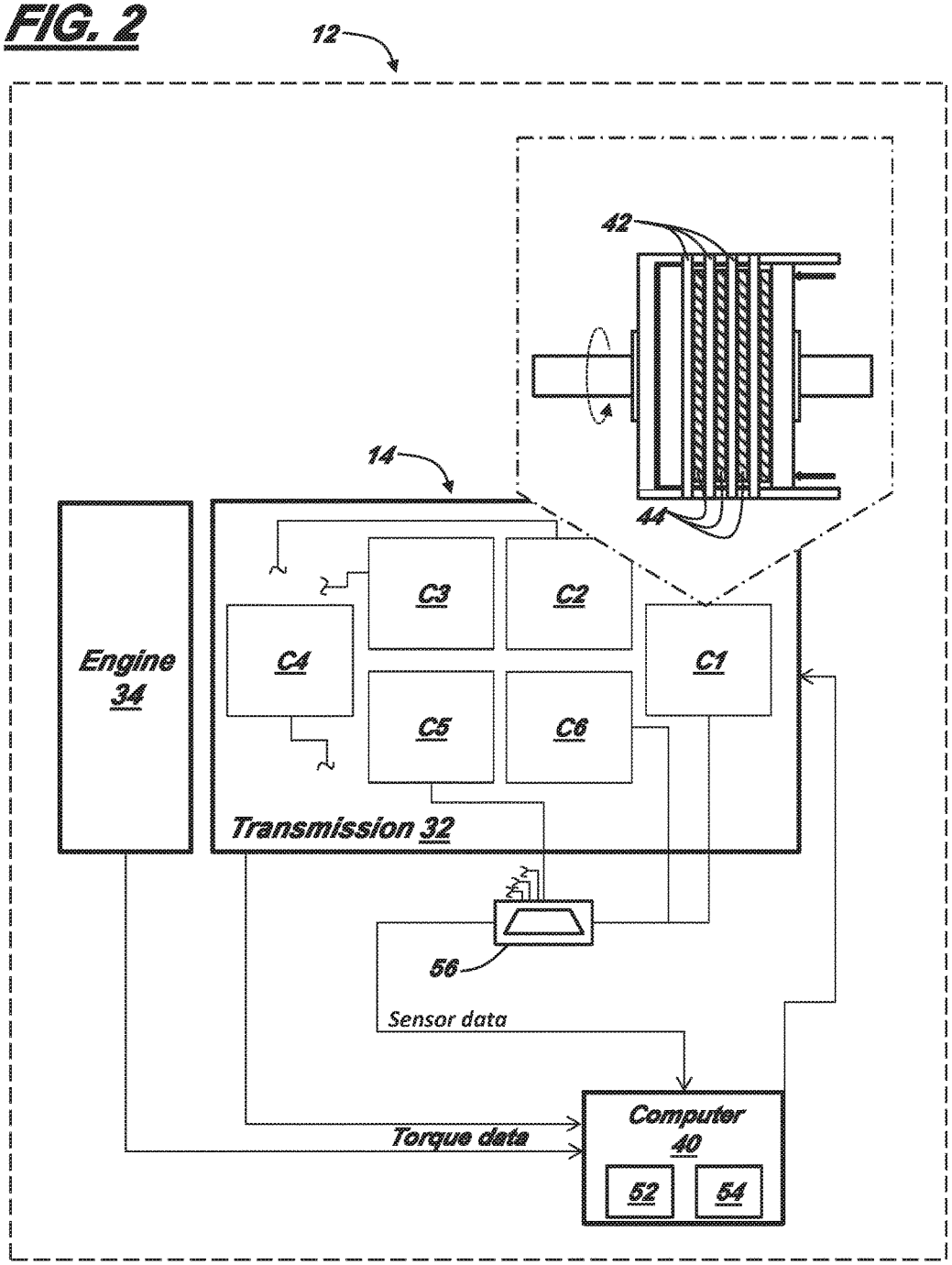
FIG. 2 is a schematic diagram of an adaptive transmission system for an exemplary vehicle.

The adaptive transmission system 14 includes an automatic transmission 32 mechanically coupled to a vehicle engine 34, and also an onboard computer 40 (e.g., a powertrain control module). As shown in FIG. 2, transmission 32 may have one or more clutch assemblies C1, C2, C3, C4, C5, C6 which may be engaged in any suitable manner to change or switch between transmission gear ratios. One such clutch assembly (C1) is shown schematically; however, neither this assembly C1 nor other assemblies C2-C6 will be described in detail herein as clutch assemblies, their respective components (clutch plates, clutch discs, etc.), their coupling to gears (e.g., such as planetary gears, etc.), their design and operation, and the like is known in the art. Thus for purposes of illustration only, a lowest gear ratio may be achieved when one or more clutch plates 42 of clutch assembly C1 are engaged with one or more associated clutch discs 44. When the transmission 32 is shifted to a next higher gear ratio (e.g., up-shifting), assembly C1 may execute a so-called off-going shift event while clutch assembly C2 at least partially concurrently may execute a so-called oncoming shift event (such shift events also will be described in greater detail below). Ultimately and upon reaching the next higher gear ratio, the clutch plates 42 and discs 44 of assembly C1 are disengaged while the corresponding clutch plates and discs (not shown) of assembly C2 are engaged. Of course, the transmission 32 may down-shift as well by reversing this process (e.g., disengaging assembly C2 while engaging assembly C1; e.g., wherein assembly C2 at least partially concurrently executes an off-going shift event while assembly C1 executes an oncoming shift event).

According to one example, the clutch assemblies C1-C6 suitably may be engaged to provide first vehicle 12 ten different speeds (e.g., ten different gear forward ratios as in the commercially available Ford™ 10R transmission which has one direct drive ratio and nine indirect drive ratios, several of which are so-called over-drive ratios; this transmission also comprises a reverse gear function). Of course, other quantities of speeds, other direct drive ratio quantities, other indirect drive ratio quantities, and the like can be used in other examples. Further, in order to change gear ratios, clutch assemblies C1-C6 need not be engaged in sequential order (e.g., C1 and C2, C2 and C3, etc.); also, e.g., more than two clutch assemblies could be engaged concurrently to achieve a desired gear ratio. Further, the quantity of clutch assemblies C1-C6 (i.e., six) shown in first vehicle 12 is merely one example; other quantities of clutch assemblies, other clutch arrangements, and shifting techniques may be used as well, as will be appreciated by skilled artisans.

According to one example, the onboard computer 40 controls each transmission shift event, as will be described more below. Computer 40 may be a single computer (or multiple computing devices—e.g., shared with other systems and/or subsystems located within first vehicle 12). Computer 40 may comprise a processor or processing circuit 52 coupled to memory 54. For example, processor 52 can be any type of device capable of processing electronic instructions, non-limiting examples including a microprocessor, a microcontroller or controller, an application specific integrated circuit (ASIC), etc.—just to name a few. In general, computer 40 may be programmed to execute digitally-stored instructions, which may be stored in memory 54, which enable the computer 40, among other things, to: execute a unique and predetermined initial shifting profile for each of the plurality of clutch assemblies C1-C6, wherein the respective profile varies depending on whether the shift event is oncoming or off-going; execute a learn mode algorithm known to skilled artisans that modifies the initial shifting profile to improve shifting quality over an interval of time (e.g., including during a settling period); during a shift event, sample or otherwise data-collect pressure data from one or more clutch assembly pressure sensors 56 (e.g., adapted to measure the pressure, force, or the like applied between, for example, clutch plates 42 and clutch discs 44); during a shift event, sample or otherwise data-collect torque output data (see FIG. 2; torque output data may be derived or calculated using techniques known to skilled artisans, e.g., using engine speed sensors, engine component inertial sensors, transmission clutch speeds, transmission component inertial sensors, vehicle acceleration sensors, a combination thereof, or the like); determine suitable clutch data (for upload to the backend computer 16) that includes the pressure and torque output data by correlating a predetermined quantity of clutch pressure measurements with a corresponding quantity of torque output determinations; and transmit or otherwise provide this clutch data to computer 16.

Memory 54 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 54 may store one or more computer program products which may be embodied as software, firmware, or the like.

As shown in FIG. 1, first vehicle 12 also may include a wireless communication module 60 and a network connection 62 which connects onboard computer 40 with module 60 and facilitates communication therebetween. Module 60 may be any suitable telematics computing device configured to wirelessly communicate with other electronic devices, including backend computer 16. Such wireless communication may include use of cellular technology (e.g., LTE, GSM, CDMA, etc.), short range wireless communication technology (Wi-Fi, Bluetooth, Bluetooth Low Energy (BLE), etc.), or a combination thereof—as will be appreciated by those skilled in the art. For example, module 60 may include an embedded cellular chipset or may facilitate cellular communication using a mobile device (not shown) within a cabin of the vehicle 12 (e.g., a cellular phone, Smart phone, etc.). Module 60 may be programmed to receive from computer 40, via the connection 62, a wireless transmission instruction coupled with clutch data that includes one or more modified shifting profiles, and based on receipt of the instruction and clutch data, wirelessly transmit the clutch data to computer 16 via the land and/or wireless communication networks 28, 30, as described more below.

Network connection 62 may include any suitable wired or wireless network intra-vehicle connection. Non-limiting examples of connection 62 include a controller area network (CAN) bus, an Ethernet connection, a Local Interconnect Network (LIN) connection, a fiber optic connection, or the like. Other examples of connection 62 also exist. For example, alternatively or in combination with e.g., a CAN bus, connection 62 could comprise one or more discrete wired and/or wireless connections.

Figure 3:
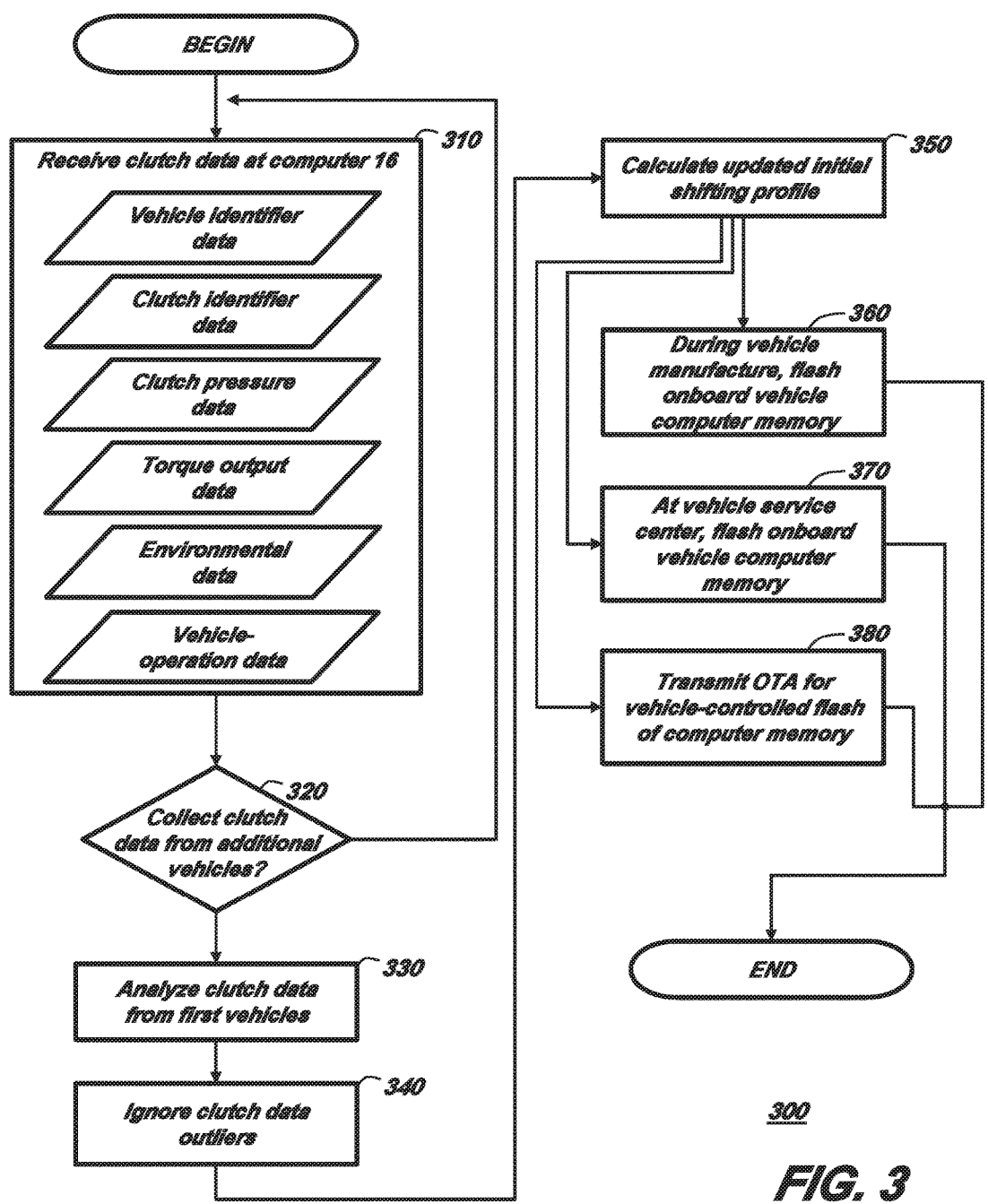
FIG. 3 is a flow diagram of a process of determining, at a backend computer, an updated initial shifting profile using clutch data received from a plurality of vehicles.

Turning now to FIG. 3, a process 300 is shown of determining, at backend computer 16, a number of updated initial shifting profiles using clutch data received from a plurality of first vehicles 12. The process 300 begins with block 310 wherein the computer 16 receives clutch data from a plurality of first vehicles 12 in a diagnostic data upload (i.e., a wireless transmission via wireless communication modules such as module 60). According to at least one example, these first vehicles 12 are vehicles which have been transferred (e.g., leased, sold, etc.) to a number of different users (e.g., licensees, owners, etc.) and which have been driven thereby more than a threshold (e.g., more than a threshold quantity of engine operating hours, more than a threshold quantity of odometer miles, during a settling period, or the like).

According to one example, these first vehicles 12 may be programmed to send clutch data to the computer 16 based on a trigger event—e.g., including but not limited to an odometer parameter or a time parameter. For example, the odometer parameter may be a predetermined odometer reading (e.g., at 1000 miles, at 2000 miles, at 5000 miles, 10,000 miles, etc.). And the time parameter may be a time-of-vehicle possession (e.g., following 1 month, 3 months, 6 months, 12 months, etc. of user lease or purchase). The time parameter also could be a periodic calendar division (e.g., such as at the end of each month, quarter, year, etc.).

Regardless of the threshold, the first vehicles 12 may transmit clutch data to computer 16 via a diagnostic data upload—e.g., by providing the clutch data to the wireless communication module 60 via network connection 62, and then by module 60 transmitting the data upload to computer 16 via the wireless communication network 30, the land communication network 28, or both. According to at least some examples, the clutch data may include one or more of: vehicle identifier data, clutch identifier data, clutch pressure data, torque output data, environmental data, vehicle-operation data, etc., just to name a few non-limiting examples. And other data types not listed here also could be provided.

Vehicle identifier data may include an identifier unique to the respective first vehicle 12 such as a vehicle identification number (VIN). In addition, or alternatively, it may include identifying information associated with a powertrain system of the particular vehicle 12. For example, it may include information pertaining to a transmission model identifier, an engine model number, and/or the like. In this manner, the data types described below may be associated with a vehicle make identifier, a vehicle model identifier, a transmission serial identifier, etc.

Clutch identifier data may be information unique to the particular vehicle transmission model. For example, for any identified transmission model, the first vehicle 12 may have a predetermined quantity of clutch assemblies (e.g., such as assemblies C1-C6 shown in FIG. 2). According to one example, the clutch identifier data may identify which clutch assemblies C1-C6 are associated with the clutch pressure data and torque output data for a particular a shift event.

Clutch pressure data may include a number of discrete measurements of an applied clutch pressure detected by sensor(s) 56 during a shift event. For example, during a shift event from a first or lowest gear ratio to a second or higher gear ratio, the pressure between plates 42 and discs 44 may vary (e.g., continuously) over a time interval associated with an off-going shift event of clutch assembly C1 (e.g., an off-going pressure vs. time profile). Similarly, during this same shift event, the pressure between the plates and discs of clutch assembly C2 may vary (e.g., continuously) over the same time interval (e.g., an oncoming pressure vs. time profile). In this example, the clutch pressure data may include a predetermined quantity of these discrete measurements. Further, the clutch pressure data may correlate these off-going and oncoming profiles to one another; similarly, the clutch pressure data may be correlated to the torque output data discussed below.

Clutch pressure data also may identify whether the respective measurements are associated with an off-going or an oncoming shift event. Further, at least some of this clutch pressure data may be stored in memory 44 (of onboard computer 40).

Torque output data may include transmission torque output data that corresponds to the discrete clutch pressure measurements of the clutch pressure data. For example, onboard computer 40 may determine and provide the torque output data in the data upload (block 310) using a number of torque-related measurements by which transmission torque may be calculated (e.g., either by computer 40 or computer 16). For example, the torque-related measurements may include data from engine speed sensors, engine component inertial sensors, transmission clutch speeds, transmission component inertial sensors, vehicle acceleration sensors, a combination thereof, or the like. Skilled artisans will appreciate how torque output (e.g., torque transferred to a drive axle) may be calculated—e.g., by computer 40 or computer 16—using such data. Again, this calculated torque output data may vary (e.g., continuously) for any given shift event; accordingly, the torque output data provided in the data upload may include a number of discrete torque output values that correspond to the discrete pressure measurements (of the clutch pressure data)—e.g., a number of torque output values vs. a time interval.

Thus, the clutch data provided in the diagnostic data upload may include a number of modified off-going and oncoming shifting profiles (or such profiles can be determined from the clutch pressure and torque output data provided therein). Moreover, the clutch data can be considered a snapshot (at the time of the trigger event) of a variance of the initially programmed shifting profiles (e.g., for each of the adaptive transmission shift events). That is, the clutch data can indicate how much the initial shifting profiles have been modified by the learn mode algorithm of the adaptive transmission.

Environmental data—which also may be provided in the clutch data of block 310—may include temperature data, altitude data, etc. associated with the shift event. It also may include information associated with weather condition data or road condition data—e.g., whether it is precipitating (precipitation data including, e.g., whether it is raining, snowing, etc.) and/or whether the roads are snow-covered, icy, etc., as these factors may affect transmission shifting. According to one example, the received environmental data may correspond to a number of pressure data measurements. In other examples, the environmental data may include information pertaining to how much of the transmission adaptation time can be associated with specific environmental conditions. To illustrate, the environment data could indicate that during the first 2000 miles of driving first vehicle 12 the roads were snow-covered 50% of the time, that the altitude was greater than 3000 feet above sea level, that the average ambient temperature was 36° F., or the like. These of course are non-limiting examples. As discussed below, computer 16 may use this environmental data when determining the updated initial shifting profiles for second vehicles 18 as these types of factors may affect how the learn mode algorithm has modified the respective initial shifting profiles of the first vehicle 12.

Vehicle-operation data may include any data associated with vehicle driving modes, driving style of the vehicle user, etc. For example, some first vehicles may be equipped with a user-configurable 'sport mode,' 'cruising mode,' or the like. Further, in at least one example, onboard computer 40 may be programmed to determine a driving style of the vehicle user(s)—non-limiting examples include an aggressive-driver style, a passive-driver style, etc. According to one example, the vehicle-operation data may correspond to a number of pressure data measurements. In other examples, the vehicle-operation data may include information pertaining to how much of the transmission adaptation time has included specific driving modes, driving styles, etc. To illustrate, the vehicle-operation data could indicate that during the first 2000 miles of driving first vehicle 12 the vehicle 12 was driven in the sport mode 50% of the time, that the driving style was aggressive 75% of the time, or the like. These of course are non-limiting examples. As discussed below, computer 16 may use this vehicle-operation data when determining the updated initial shifting profiles for second vehicles 18 as these types of factors may affect how the learn mode algorithm has modified the respective initial shifting profiles of the first vehicle 12.

In block 320 which follows block 310, the backend computer 16 may determine whether clutch data from additional first vehicles 12 is to be received and evaluated. If additional first vehicles 12 data are reporting, the process 300 loops back, repeats block 310 and thereby receives additional clutch data. And this process may occur until all first vehicles 12 have reported, until a reporting period expires, or the like. Thereafter, process may proceed to block 330.

Figure 4:
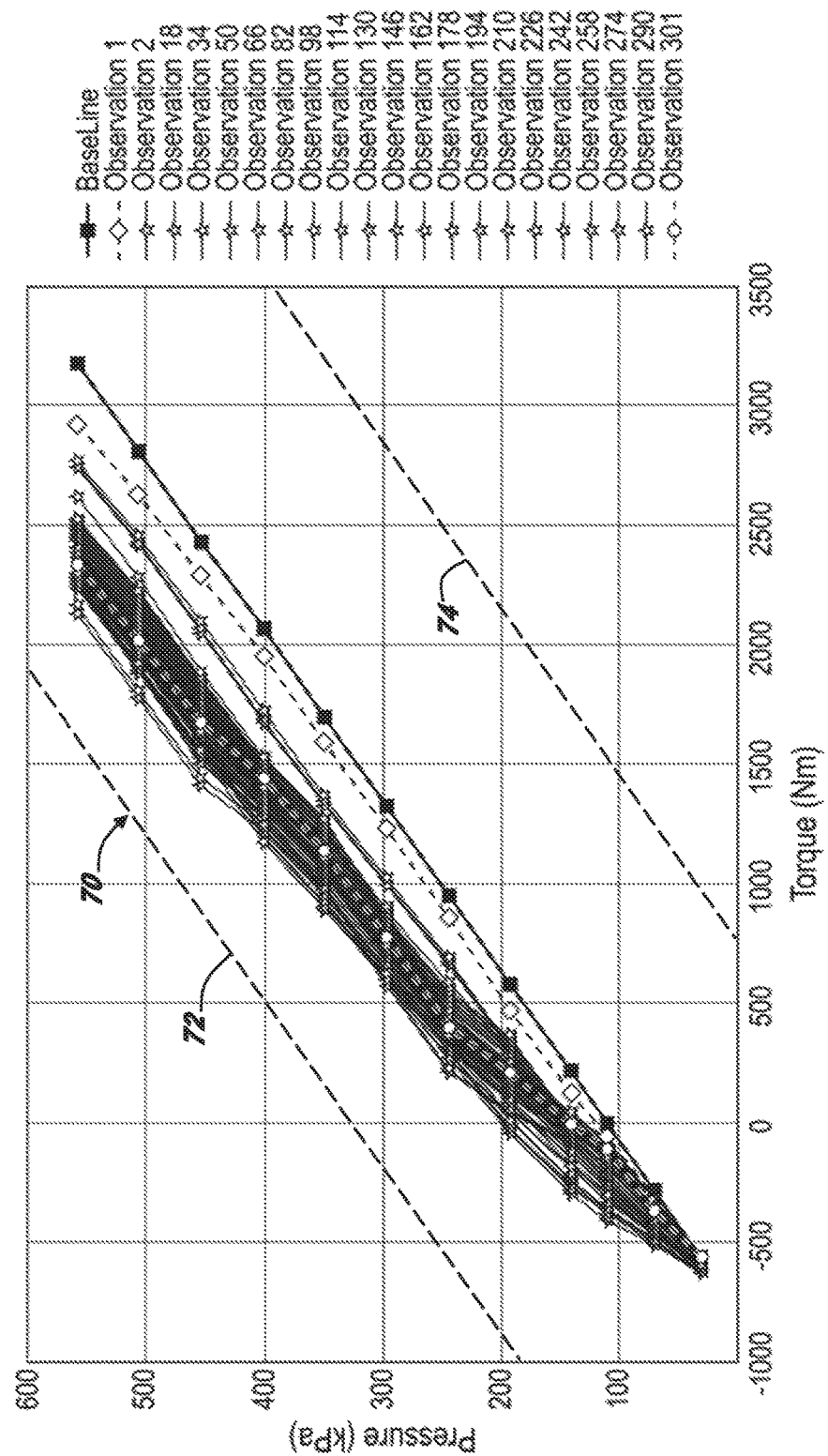
FIG. 4 is a graphical depiction of a number of observations of clutch data during an off-going shift event of an adaptive transmission in the exemplary vehicle shown in FIGS. 1-2.
Figure 5:
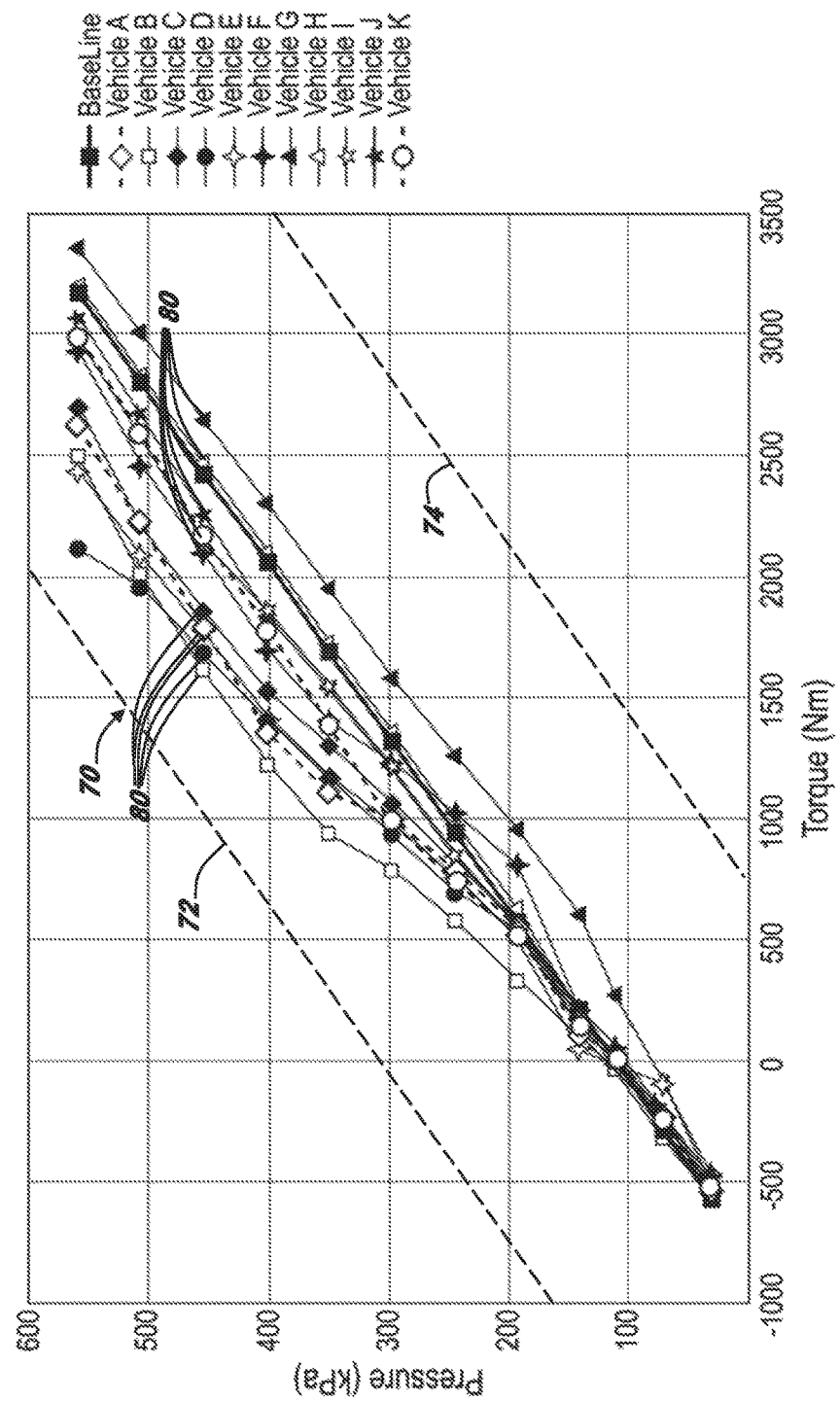
FIG. 5 is a graphical depiction of a number of modified shifting profiles from a plurality of vehicles such as the exemplary vehicle shown in FIGS. 1-2.

In block 330, the backend computer 16 analyzes the clutch data. FIGS. 4-5 illustrate examples of clutch data available for analysis which was received as a result of blocks 310-320. More particularly, FIG. 4 illustrates a number of observations made by one exemplary first vehicle 12—including one exemplary modified off-going shifting profile defining where the adaptive transmission system 14 has settled, and FIG. 5 illustrates a number of corresponding, modified shifting profiles from multiple first vehicles 12—wherein the profiles pertain to an off-going shift event of a particular clutch assembly, wherein the respective adaptive transmission systems have settled. Each will be discussed in turn.

FIG. 4 graphically depicts a number of off-going shifting profiles (e.g., one labeled 'baseline' and others labeled 'observations') associated with one of the clutch assemblies of vehicle 12 (e.g., assembly C4). Each observation (1-301) is a snapshot of a discrete number of pressure measurements (in kilo-Pascals, kPa) and a corresponding number of torque outputs (in Newton-meters, Nm) at a particular time of measurement. For sake of clarity, a limited number of these observations are graphed (e.g., 1, 2, 18, 34, . . . , 301); it should be appreciated that 301 observations in this instance were made. In FIG. 4, the baseline shifting profile is the initial shifting profile programmed into vehicle computer 40 (e.g., for clutch assembly C4 and for an off-going shift event). Each of the observations 1-301 can be variations from the baseline and from one another. More particularly, these observations represent different torque output values for each of the measured clutch pressure values—as the learn mode algorithm of the respective adaptive transmission system 14 modifies the initially programmed shifting profile. Further, each observed shifting profile can be a modification of the previously-observed shifting profile. FIG. 4 illustrates that later observations (e.g., ~114-301) are clustered more closely together as the adaptive transmission system 14 settles. And observation 301 represents the observation made at the time of the trigger event (of block 310)—or the last made observation prior to the trigger event.

FIG. 4 also illustrates an expected shifting profile window or band 70 defined by an upper threshold 72 and a lower threshold 74—e.g., the thresholds 72, 74 being measured from the baseline shifting profile. In this example, the upper and lower thresholds are +/−230 kPa, respectively; however, this is merely an example (and other upper and lower thresholds exist, including those where the magnitude of the upper threshold differs from that of the lower threshold). Further, this window 70 is associated with a particular shift event (e.g., the off-going shift event of clutch assembly C4); in other shift events involving different clutch assembles (and depending on whether the shift event is oncoming or off-going), the upper and lower thresholds may differ. As will be explained more below, computer 16 (or computer 40) may use this window to determine a modified shifting profile outlier, thereby exclude at least some of the clutch data of a particular first vehicle from the remainder of process 300 if the modified shifting profile is outside of the window 70.

FIG. 5 graphically depicts a number of off-going modified shifting profiles (e.g., one labeled 'baseline' and others labeled 'vehicle A, vehicle B, . . . , vehicle K') associated with a respective clutch assembly (e.g., assembly C4) of each of the first vehicles 12 after settling. The shifting profiles of each of the first vehicles 12 can be a snapshot of the clutch data provided to backend computer 16 by the respective first vehicles 12—further, each profile here may correspond to a modified shifting profile such as observation 301 of FIG. 4—i.e., it can represent where the respective adaptive transmission system has settled (for the particular shifting profile at the time of the respective trigger event—e.g., the last observation made before the trigger event). FIG. 5 illustrates only eleven modified shifting profiles for sake of clarity; however, it should be appreciated that any suitable number of shifting profiles may be analyzed in block 330 (e.g., including profiles from potentially hundreds of thousands of first vehicles 12).

The analysis in block 330 may include grouping first vehicles 12 according to: vehicle identifier data (e.g., according to vehicle make, vehicle model, vehicle transmission model, vehicle engine model, or any combination thereof); clutch identifier data; environmental data (e.g., according to vehicle altitude categories, vehicle precipitation categories, vehicle roadway driving conditions, or any combination thereof); vehicle-operation data (e.g., according to vehicle driving mode categories, vehicle driving style types, or any combination thereof); or any combination thereof. These also are merely examples; other grouping parameters and/or classifications may be used singly and/or in combination with the examples set forth above.

Block 340 is optional—further block 340 may precede, follow, and/or occur at least partially concurrently with block 330. In at least one example of process 300, backend computer 16 determines to ignore at least some clutch data from first vehicles 12. In one example, at least some of the clutch data is ignored because it is considered an outlier—i.e., a particular modified shifting profile may be determined to be outside of window 70 (e.g., the associated clutch pressure data and corresponding torque output data is greater than the predetermined upper threshold, less than the predetermined lower threshold, or both (i.e., some of the measured data lies above the upper threshold, while other measured data in the same profile lies below the lower threshold). Of course, since the clutch data may include a number of modified shifting profiles from a particular first vehicle 12, some profiles may be ignored while others are not. According to one example, data may be ignored when less than a predetermined threshold percentage of first vehicles 12 report data that is outside of the window for the respective shift event of the respective clutch assembly C1-C6 (e.g., outside of window 70).

In block 350 which follows, backend computer 16 may determine or calculate one or more updated initial shifting profiles using the clutch data received in block 310, analyzed in block 330, and not ignored in block 340. Again, each of the updated initial shifting profiles may be associated with a particular clutch assembly (e.g., C1-C6), either an oncoming or an off-going shift event, a particular vehicle make, a particular vehicle model, a particular adaptive transmission model, one or more environmental categories, one or more vehicle-operation categories, the like, or any combination thereof. According to one example, backend computer 16 performs an averaging calculation. For example, using the received clutch data shown in FIG. 5, computer 16 may average each of the sets of corresponding data points 80 of the respective modified shifting profiles, and thereby determine the updated initial shifting profile. It will be noted that in the example shown in FIG. 5, each modified shifting profile comprises twelve predetermined data points. Thus, each of the sets of corresponding data points 80 (e.g., eleven—one for each profile) could be averaged—e.g., creating twelve new data points collectively representing a new shifting profile—i.e., an updated initial shifting profile. Of course, more or fewer than eleven modified shifting profiles may be used in the calculation; and of course, each modified shifting profile could be defined by more or fewer than twelve measurements. As described more below, this updated initial shifting profile may be provided to second vehicles 18 at a time of manufacture so that the second vehicles settle more quickly than did the first vehicles 12.

Backend computer 16 may determine the updated initial shifting profile in other ways as well—e.g., by executing a trend-line calculation by performing a statistical analysis of the clutch data received in block 310, analyzed in block 330, and not ignored in block 340. Thus, continuing with the example shown in FIG. 5, the modified shifting profiles for vehicles A-K may be used as the basis of the trend-line determination. Methods of trend-line calculations are known and will not be described further herein. The averaging calculation and trend-line calculation are merely examples of mathematical calculations which may be executed by computer 16 to determine an updated initial shifting profile; other examples are also possible. And of course, additional updated initial shifting profiles may be determined for other clutch assemblies, off-going or oncoming shift events, or the like. Furthermore, as discussed above, the updated initial shifting profiles may be suited to particular environmental circumstances, vehicle-operation circumstances, or the like. Thus, second vehicles 18 being shipped to a dealership in a particularly arid climate (e.g., such as Phoenix, Ariz.) in the month of June may have different updated initial shifting profiles than second vehicles 18 being shipped to dealerships in Detroit, Mich. in January. Or for examples, second vehicles 18 having a sport mode, having engines with higher low-end torque, or the like may have different updated initial shifting profiles than second vehicles without a sport mode, with differently configured low-end torque, or the like.

Following block 350, process 300 may proceed to at least one of blocks 360, 370, or 380. In block 360, the updated initial shifting profile(s) are provided to second vehicles 18—again, i.e., to vehicles which are at a vehicle manufacturing facility or which have not yet been leased or sold. Respective vehicle computer memory (e.g., such as powertrain control module memory 54) may be flashed (or re-flashed) on a vehicle production line—typically, re-flashing procedures of numerous computers, modules, etc. occur once assembly is completed. Or re-flashing may occur at respective second vehicle destinations (e.g., vehicle sales dealerships) by authorized service center technicians.

In block 360, second vehicles 18 which are relatively new may be re-flashed—e.g., again at an authorized vehicle service center. And in block 370, the backend computer 16 may transmit over-the-air messages to numerous vehicles (e.g., including vehicles 12 and/or 18) which then can receive the message and install the updated initial shifting profile. For example, this may be user-initiated re-flash process or a process which otherwise occurs while the vehicle is safely parked, as will be appreciated by skilled artisans.

Blocks 360, 370, and 380 occur alternatively or in combination with one another. Further, they may occur in series and/or at least partially concurrently. Moreover, these are merely examples for disseminating the updated initial shifting profiles; other examples also can be implemented. Following any of blocks 360-380, the process 300 may end.

Other implementations are also possible. For example, module data from a plurality of first vehicles may be provided to the backend computer 16 and a process similar to process 300 may be carried out—e.g., wherein this module data is data from a module other than powertrain control module 40. According to one such non-limiting example, the modules in the first vehicles may be similar door control modules which use each a similar adaptive algorithm and execute an initial profile. The adaptive algorithm here may pertain to door closing data, balancing data, pinching data, and/or bounce-back data. The vehicle module may execute the algorithm to generate a modified profile. And this data (the modified profile data) may be similarly received at the backend computer 16. Thereafter, the data may be analyzed, some of the data may be ignored, one or more mathematical calculations may be performed using the data, and an updated initial profile may be provided to a second plurality of vehicles and/or at least some of the first vehicles. Data from other vehicle modules may be processed at the backend computer 16 in a similar manner.

Thus, there has been described a backend computer programmed to receive data from a number of first vehicles using a first profile stored in and executed by a vehicle module. Using the data, the backend computer can determine one or more second profiles for the modules of a number of second vehicles and/or even some of the first vehicles. According to one example, the first and second profiles pertain to an adaptive transmission system.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Matlab, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising a processor and memory storing instructions executable by the processor that include, to:
   receive adaptive transmission clutch data from a plurality of first vehicles, the data from each first vehicle including a modified shifting profile;
   determine, using the received data, an updated initial shifting profile; and
   provide the updated initial shifting profile to a plurality of second vehicles.

2. The computer of claim 1, wherein, for each of the plurality of first vehicles, the data is associated with clutch pressure data and torque output data during a shift event, wherein the data also is associated with a learn mode algorithm executed by an onboard computer that controls the respective adaptive transmission.

3. The computer of claim 1, wherein, for each of the plurality of first vehicles, the data is associated with an on-coming shift event or an off-going shift event at a clutch assembly of the respective transmission.

4. The computer of claim 1, wherein the data comprises clutch pressure data and corresponding torque output data for a clutch assembly of the adaptive transmission during an oncoming shift or an off-going shift.

5. The computer of claim 4, wherein the data further comprises one or more of vehicle identifier data, environmental data, or vehicle-operation data, wherein the determination of the updated initial shifting profile is at least partially based on the environmental data, the vehicle-operation data, or both.

6. The computer of claim 5, wherein the environmental data is associated with temperature data, altitude data, precipitation data, road-condition data, or a combination thereof, and wherein the vehicle-operation data is associated with a vehicle driving mode, a user-driving style, or a combination thereof.

7. The computer of claim 1, wherein the data is transmitted from the plurality of first vehicles based on a trigger event, wherein the trigger event includes at least one of an odometer parameter or a time parameter.

8. The computer of claim 1, wherein, for each of the plurality of first vehicles, the modified shifting profile is a modification of an initial shifting profile that has been modified by a learn mode algorithm executed by an onboard vehicle computer that controls the respective adaptive transmission.

9. The computer of claim 8, wherein the determination of the updated initial shifting profile includes determining an averaging calculation of the modified shifting profiles received from at least some of the plurality of first vehicles.

10. The computer of claim 9, wherein determining the averaging calculation includes calculating an average clutch pressure value for a plurality of corresponding predetermined data points within the modified shifting profiles.

11. The computer of claim 10, wherein the instructions further comprise: to ignore at least some of the data received from the plurality of first vehicles based on the at least some of the data being greater than a first threshold, less than a second threshold, or a combination thereof.

12. The computer of claim 8, wherein the determination of the updated initial shifting profile includes determining a trend-line calculation of the modified shifting profiles received from at least some of the plurality of first vehicles.

13. The computer of claim 12, wherein the instructions further comprise: to ignore at least some of the clutch data received from the plurality of first vehicles based on the at least some of the clutch data being greater than a first threshold, less than a second threshold, or a combination thereof.

14. The computer of claim 1, wherein providing the updated initial shifting profile includes at least one of: flashing the memory of a computer onboard each of the plurality of second vehicles during a vehicle manufacturing process, re-flashing the memory of a computer onboard at least some of the plurality of second vehicles at a vehicle service center, or transmitting an over-the-air update to at least some of the plurality of first or second vehicles containing the updated initial shifting profile.

15. The computer of claim 1, wherein the plurality of second vehicles includes at least one of the plurality of first vehicles.

16. A method, comprising:
   receiving adaptive transmission clutch data from a plurality of first vehicles, the data from each first vehicle including a modified shifting profile;
   determining, using the received data, an updated initial shifting profile; and
   providing the updated initial shifting profile to a plurality of second vehicles.

17. The method of claim 16, wherein, for each of the plurality of first vehicles, the data is associated with an on-coming shift event or an off-going shift event at a clutch assembly of the respective transmission.

18. The method of claim 16, wherein, for each of the plurality of first vehicles, the modified shifting profile is a modification of an initial shifting profile that has been modified by a learn mode algorithm executed by an onboard vehicle computer that controls the respective adaptive transmission.

19. The method of claim 16, wherein the determination of the updated initial shifting profile includes determining an averaging calculation or a trend-line calculation of the modified shifting profiles received from at least some of the plurality of first vehicles.

20. The method of claim 19, wherein determining the averaging calculation includes calculating an average clutch pressure value for a plurality of corresponding predetermined data points within the modified shifting profiles.

* * * * *